No. 697,249. Patented Apr. 8, 1902.
G. P. HERRICK.
BLAST FURNACE.
(Application filed Oct. 1, 1901.)
(No Model.) 3 Sheets—Sheet 2.

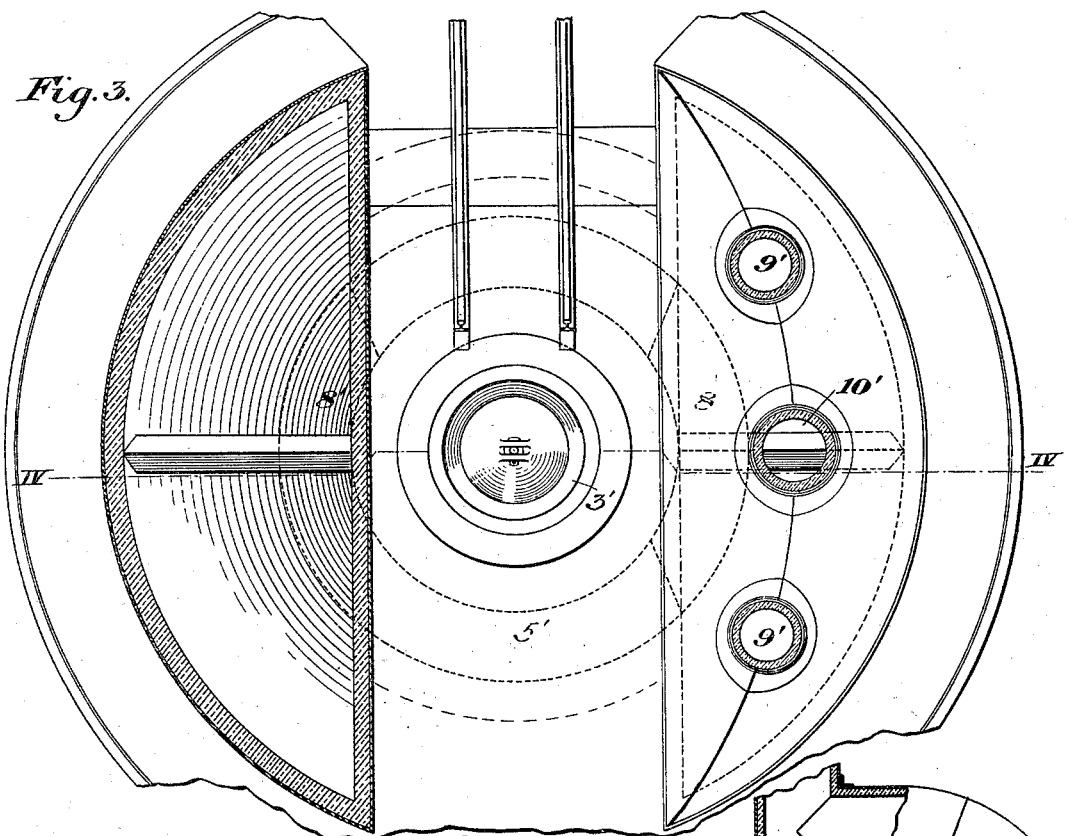
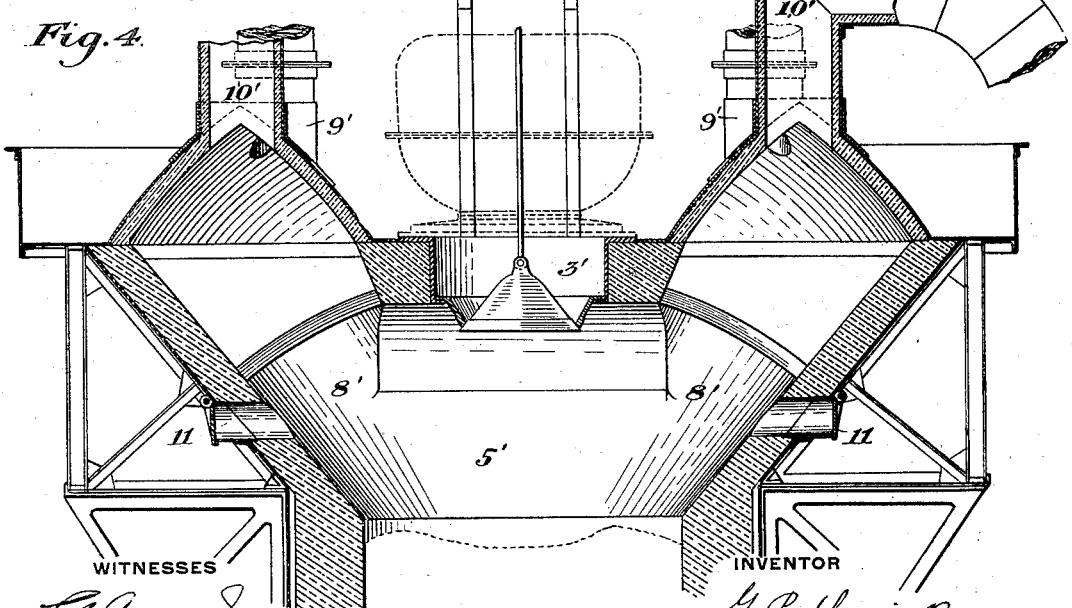

UNITED STATES PATENT OFFICE.

GERARD P. HERRICK, OF NEW YORK, N. Y.

BLAST-FURNACE.

SPECIFICATION forming part of Letters Patent No. 697,249, dated April 8, 1902.

Application filed October 1, 1901. Serial No. 77,243. (No model.)

*To all whom it may concern:*

Be it known that I, GERARD P. HERRICK, of New York, in the county and State of New York, have invented a new and useful Blast-Furnace, of which the following is a full, clear, and exact description, reference being had to the accompanying drawings, forming part of this specification, in which—

Figure 1:
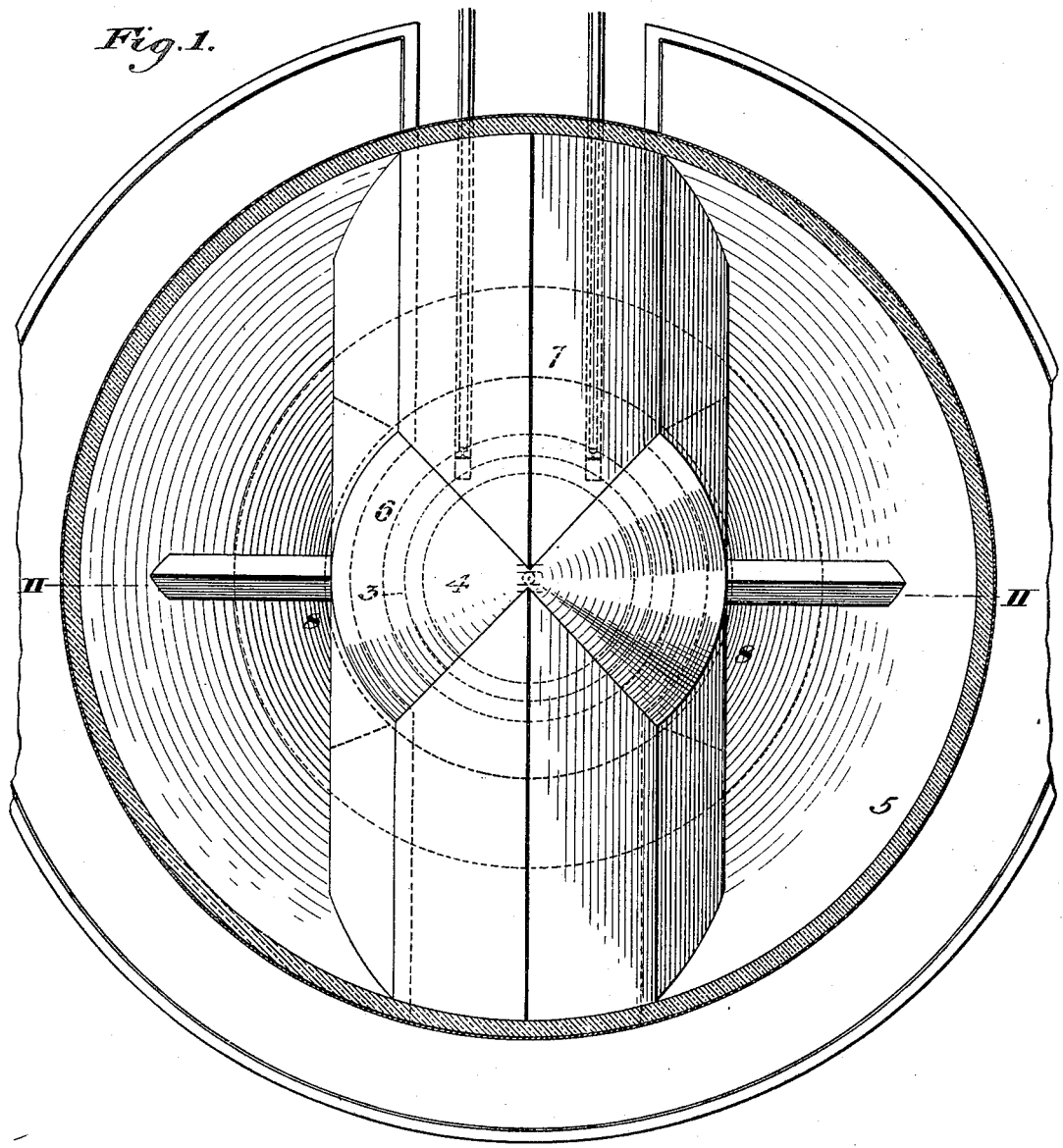
Figure 2:
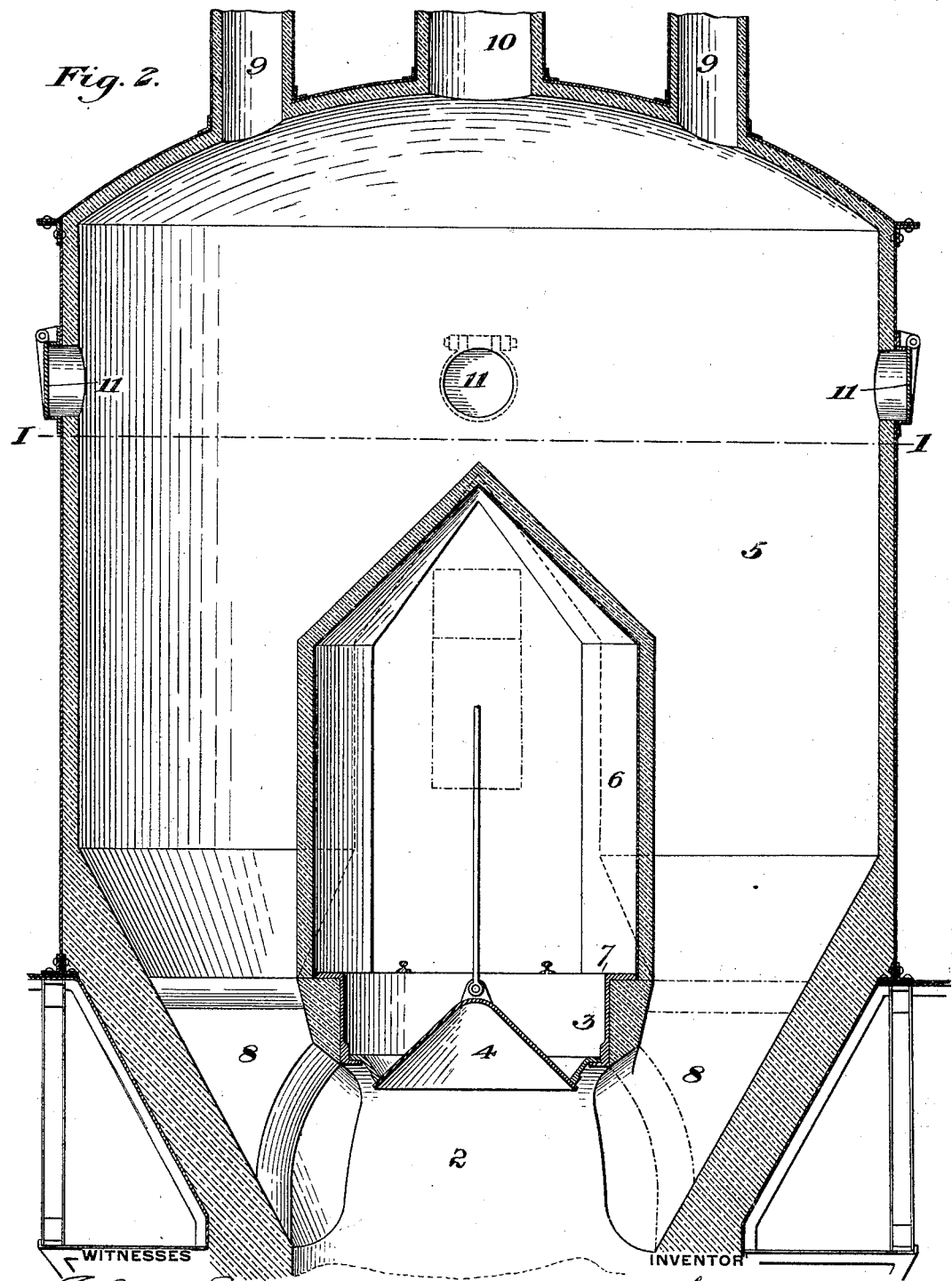

Figure 1 is a horizontal section on the line I I of Fig. 2. Fig. 2 is a vertical section on the line II II of Fig. 1. Fig. 3 is a top plan view, partly in section, showing another arrangement of the dust-chamber; and Fig. 4 is a vertical section on the line IV IV of Fig. 3.

In the operation of blast-furnaces for smelting ore there is a very considerable loss of stock from the furnace, which is carried off in the form of flue-dust with the blast-furnace gases. This is especially so in furnaces used for smelting finely-divided ores. Attempts have been made to collect this dust in settling-chambers of various kinds and when a quantity of it has been accumulated to withdraw it from the chamber and discharge it into the furnace either as dust or in the form of briquets; but such devices are unsatisfactory, because they are useful only to catch the dust which has already been carried off and do not tend to prevent the escape of the dust from the zone of fusion.

Referring to the drawings, in which I illustrate my invention in what I believe to be its preferred forms, in Figs. 1 and 2, 2 represents the upper part or throat of a blast-furnace. 3 is a hopper adapted to discharge the stock concentrically within the furnace and provided with a suitable stock-distributer or bell 4 at the top of the furnace—*i. e.*, above the stock-line—which being outwardly directed or inclined serves to distribute the stock from the center outwardly. 5 is a dust-chamber situated above the furnace and preferably concentric therewith, and 6 is a suitably-arched chamber or passage above the hopper and opening onto the charging-platform 7, so as to give access to the hopper for the charging apparatus, by which the stock is fed to the furnace. The dust-chamber 5 communicates downwardly with the throat of the furnace below the hopper through openings or passages 8, which are freely and constantly open for the passage of the gases into the chamber from the furnace and for the downward discharge of dust from the chamber into the furnace. 9 9 are bleeder-pipes, and 10 is the bleeder-pipe which leads to the downcomer, through which the furnace-gases are conducted for use at the stoves or boilers. 11 11 are suitable explosion-doors. The top of the chamber 6 is inclined, so as to cause the discharge of any particles of dust which may settle thereon, and the chamber itself is supported suitably on cross-supports or walls, as shown in the drawings. When the furnace is in use, the furnace-gases rise through the passages 8 and chamber 5 to the pipe 10. The enlarged size of the chamber 5 decreases the velocity of the gas, and thus decreases the force which tends to carry off the dust particles from the furnace until the force of gravity is equal to or greater than the force exerted upon the particles by the blast, when the particles or a large portion thereof cease to rise and remain in the chamber. The column of dust which accumulates and is held in suspension in the chamber 5 acts by gravity and also in the manner of a mechanical sieve to oppose the escape of dust from the furnace, while still allowing the gas to percolate therethrough, for said column is directly in the path of the current of gas and is in communication with the furnace through the passages 8. The device is therefore self-acting and the dust is in a large measure retained in the furnace, and is thus saved and smelted without the expense of apparatus and labor incurred where dust is first collected and then returned. The stock-line is shown in the drawings by dotted lines. The distributer or bell 4 interrupts the vertical communication between the offtake or bleeder pipe 10 and the furnace-stack and deflecting the gases causes them to be more evenly distributed through the chamber 5.

In the form of my invention just described the dust-chamber 5 is mainly above the hopper. In Figs. 3 and 4 I show a construction in which the chamber is mainly below the hopper and is constituted by vertically increasing the normal distance between the stock-line and charging apparatus and enlarging horizontally the throat of the blast-furnace. 5' represents the chamber formed, as just stated, by enlarging the throat of the furnace horizontally and vertically, as above described, but, as in the construction of Figs. 1 and 2, the chamber 5' in Fig. 4 is in free downward communication with the main stack below the hopper 3' and below the charging-platform. From the top of the chamber 5' extend pipes 9' 10', and the pipes 10' are connected with the downcomers or offtake-pipes which lead the gases to the point of use. The operation of this form of my invention is like that above described. The velocity of the gas and so the force tending to expel the dust are checked in the enlarged dust-chamber 5', and the column of dust therein acts to keep the dust of the furnace burden within the zone of fusion, as above explained.

In both constructions above described the dust-chamber has greater vertical height between the stock-line and the mouth of the offtake-pipe than the ordinary distance between the stock-line and the top of the stack in iron blast-furnaces unprovided heretofore with dust-chambers above the stock-line, and it is therefore a prolonged chamber, as well as being enlarged in cross-section relatively to the furnace-throat, and the enlargement is transverse to the direction of natural flow of the gases, the purpose being to reduce their velocity. The mouth of the offtake-pipe is situated at such distance from the stock-line that when the gases reach the offtake-pipe the force of gravity shall have checked the rise of the particles of dust or so much of them as it is desired to retain in the furnace.

The term "furnace-throat" is used in the description and claims in its usual significance, meaning that portion of the furnace-shaft at or above the stock-line.

The skilled furnace-builder will be enabled from the above description to modify the construction of the apparatus and to apply it in various forms other than those which I have shown without departure from my invention, since

What I claim is—

1. Apparatus for preventing escape of dust from blast-furnaces, comprising in combination with the furnace and concentric hopper and an outwardly-directed stock-distributer situated at the top of the furnace, a dust-chamber situated between the stock-line and the offtake-pipe enlarged transversely to the direction of natural flow of the gases and prolonged upwardly, said dust-chamber opening downwardly and freely into the furnace below the hopper, and an offtake-pipe leading to a place of use and situated at such distance from the stock-line that the particles of dust to be retained in the furnace shall be checked before reaching said offtake-pipe; substantially as described.

2. Apparatus for preventing escape of dust from blast-furnaces comprising in combination with the furnace and concentric hopper and an outwardly-directed stock-distributer situated at the top of the furnace, a dust-chamber situated between the stock-line and the offtake-pipe, enlarged transversely to the direction of the natural flow of the gases and prolonged upwardly, said dust-chamber opening downwardly and freely into the furnace below the hopper and forming a passage for the gases at some part substantially vertical; substantially as described.

3. Apparatus for preventing escape of dust from blast-furnaces comprising in combination with the furnace, hopper and concentric outwardly-directed stock-distributer situated at the top of the furnace, a dust-chamber enlarged transversely relatively to the furnace-throat, prolonged vertically above the hopper and opening freely at its base into the furnace, and an offtake-pipe leading to a place of use from the dust-chamber at such elevation that the particles of dust to be retained in the furnace shall be checked before reaching said offtake-pipe; substantially as described.

4. Apparatus for preventing escape of dust from blast-furnaces, comprising in combination with the furnace and an outwardly-directed stock-distributer situated at the top of the furnace, a dust-chamber prolonged upwardly above the stock-line enlarged transversely relatively to the furnace-throat, and opening freely at its base into the furnace below the level of the charging-opening, and an offtake-pipe leading to a place of use from the dust-chamber at such elevation that the particles of dust to be retained in the furnace shall be checked before reaching said offtake-pipe; substantially as described.

5. Apparatus for preventing escape of dust from blast-furnaces, comprising in combination with the furnace, a concentric charging device and outwardly-directed stock-distributer situated at the top of the furnace, a dust-chamber prolonged upwardly at the top of the furnace and enlarged transversely relatively to the furnace-throat, said dust-chamber having its blast-inlet solely from the furnace and opening downwardly and freely into the furnace below the charging-opening, and an offtake-pipe; substantially as described.

6. Apparatus for preventing escape of dust from blast-furnaces, comprising in combination with the furnace, a dust-chamber at the top of the furnace, a concentric charging-opening, and a transverse passage 6 leading to the charging-opening, said dust-chamber extending above said passage; substantially as described.

7. Apparatus for preventing escape of dust from blast-furnaces, comprising in combination with the furnace, a concentric charging device, and an outwardly-directed stock-distributer situated at the top of the furnace, a dust-chamber prolonged upwardly at the top of the furnace and enlarged transversely relatively to the furnace-throat, said dust-chamber having its blast-inlet solely from the furnace and opening downwardly and freely into the furnace through an opening or openings through which the dust enters from and returns to the furnace, and an offtake-pipe leading to a place of use; substantially as described.

8. Apparatus for preventing escape of dust from blast-furnaces, comprising in combination with the furnace and a bell-charging device situated at the top of the furnace, a dust-chamber situated at the top of the furnace and opening downwardly and freely into the furnace, said chamber being prolonged vertically and also enlarged horizontally relatively to the throat of the furnace, and an offtake-pipe situated above the charging-opening of the furnace and leading to a place of use; substantially as described.

9. In combination with a blast-furnace, a dust-chamber situated above the stock-line opening downwardly and freely into the furnace, prolonged upwardly at the top of the furnace-stack and enlarged transversely to the direction of the natural flow of the gases and relatively to the furnace-throat, an offtake having its mouth vertically above the dust-chamber and a charging device situated vertically above the furnace-stack and constructed to deflect the gases outwardly in their course to the offtake; substantially as described.

10. Apparatus for preventing escape of dust from blast-furnaces comprising in combination with the furnace, hopper and concentric outwardly-directed stock-distributer situated at the top of the furnace, and constructed to deflect the gases outwardly, a dust-chamber enlarged transversely relatively to the furnace-throat, prolonged upwardly at the top of the furnace and opening freely at its base into the furnace, and an offtake-pipe leading to a place of use from the dust-chamber at such elevation that the particles of dust to be retained in the furnace shall be checked before reaching said offtake-pipe; substantially as described.

In testimony whereof I have hereunto set my hand.

GERARD P. HERRICK.

Witnesses:
GEO. B. BLEMING,
L. M. REDMAN.